United States Patent
Delaloye et al.

(10) Patent No.: US 7,690,205 B2
(45) Date of Patent: Apr. 6, 2010

(54) GAS TURBINE ENGINE COLD START MECHANIZATION

(75) Inventors: Jim E. Delaloye, Chandler, AZ (US); Joe Keck, Gilbert, AZ (US); Barry J. Kingery, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1207 days.

(21) Appl. No.: 11/231,949

(22) Filed: Sep. 20, 2005

(65) Prior Publication Data

US 2007/0234739 A1 Oct. 11, 2007

(51) Int. Cl.
*F02C 7/26* (2006.01)
*F02C 7/275* (2006.01)

(52) U.S. Cl. .......................... 60/786; 60/788

(58) Field of Classification Search ............ 60/802, 60/786, 39.13, 787, 788, 734, 39.281
See application file for complete search history.

(56) References Cited

U.S. PATENT DOCUMENTS

| | | | |
|---|---|---|---|
| 3,769,790 A | 11/1973 | Thebert | |
| 3,858,391 A | 1/1975 | Davis et al. | |
| 4,799,354 A | 1/1989 | Midgley | |
| 5,174,109 A | 12/1992 | Lampe | |
| 6,035,626 A * | 3/2000 | Wahl et al. | 60/773 |
| 6,732,529 B2 | 5/2004 | Anderson | |
| 2001/0047647 A1* | 12/2001 | Cornet | 60/39.02 |
| 2004/0004557 A1* | 1/2004 | Sikora | 340/945 |
| 2005/0066649 A1* | 3/2005 | Lorenz | 60/39.281 |
| 2005/0279102 A1* | 12/2005 | O'Connor | 60/778 |
| 2007/0084214 A1* | 4/2007 | Schmidt et al. | 60/778 |

* cited by examiner

*Primary Examiner*—Michael Cuff
*Assistant Examiner*—Gerald L Sung
(74) *Attorney, Agent, or Firm*—Ingrassia Fisher & Lorenz, P.C.

(57) ABSTRACT

An apparatus and method is provided to start gas turbine engines at cold start. A gearbox is not mechanically coupled to any accessory or to the starter-generator. Rather, a controller is used to route power to a starter-generator to rotate the turbine mainshaft to start the gas turbine engine. The controller prevents power to an accessory drive motor, until the starter-generator creates a positive torque. When a positive torque is reached, excess power is routed to the accessory drive motor, typically a brushless direct current motor.

17 Claims, 6 Drawing Sheets

GAS TURBINE ENGINE COLD START MECHANIZATION

GOVERNMENT RIGHTS

This invention was made with Government support under Contract no. N0001902C3002 awarded by the United States Government. The Government has certain rights in this invention.

BACKGROUND OF THE INVENTION

The present invention relates generally to a start up mechanization for gas turbine engines. Particularly, the present invention relates to an apparatus for the cold starting of a gas turbine engine using a controller and direct current motor, rather than a gearbox.

U.S. Pat. No. 3,769,790 discloses a means to prohibit flow of lubricating oil to the engine by a valve that is energized to dump the lubricating oil driven by the pump driven by the engine, column 1, lines 58-64. The '790 patent employs a gearbox, referred to as a reduction gear arrangement or transmission 18, in the single Figure of the '790 patent. This patent requires the use of a gearbox.

U.S. Pat. No. 6,732,529 discloses a clutch that disengages accessories to avoid delivery of excess fuel and oil into the engine during start-up. However, the disclosed clutch mechanism is limited for use with gearboxes, as described in column 3, lines 5-8 of the '529 patent. The gearbox is illustrated in FIG. 3 of the '529 patent. This patent also requires the use of a gearbox.

Aerospace grade gas turbine engine start power is limited by the size of the energy source, e.g., battery, because energy has to be directed to start the turbine engine, and also to an accessory such as a lubricant pump drive motor to pump lubricant or oil. The battery size can be reduced if less power is required, or, if the distribution of power can be used more efficiently. Therefore, start up mechanization is critical in creating a design, which results in minimum stored energy source, e.g. battery size.

Conventionally, accessories for gas turbine engines can be divided into two categories; those driven by bleed air taken from the compressor section of the engine, and those driven mechanically by an accessory drive shaft and gearbox connected directly to the turbine shaft. The mechanical connection from the turbine shaft may be through an engine-mounted gearbox or through a power takeoff shaft to a remotely mounted gearbox.

Accessories driven by bleed air operate by utilizing high-pressure air that is available for driving aircraft accessories by air motors or air turbines. Compressor discharge air at high pressure and temperature is bled from the engine through ports. This air is ducted as a source of power. It operates accessories such as the air-conditioning units, hydraulic pumps, thrust reverser actuators, and various mechanical actuators in the airplane. Air for cockpit or cabin pressurization is also provided by bleed air from the engine compressor.

On multi-engined aircraft equipped with pneumatic engine starters, one engine is usually started from an auxiliary power unit or a ground air source. Air from this operating engine is bled through a system of ducts in the aircraft to power the starters of the other engines.

Use of an accessory drive gearbox (AGB) is a second method of driving accessories. This apparatus is a direct mechanical drive that is operated by gearing from the compressor-turbine drive shaft. Accessory drives and accessory mounting pads are provided in an engine-mounted, accessory drive gearbox or in a remotely mounted gearbox. On some turbojet engines, accessory pads and mechanically powered drives are also provided in the engine nose section. For dual compressor, axial-flow engines, the main accessory drive gearbox usually receives its power from the high-pressure compressor drive shaft. Mechanically driven accessories may include tachometers, generators or alternators, hydraulic pumps, fuel pumps, oil pumps (also known as lubricant pump drive motors), fuel controls, starters, and water pumps. In the case of AGB-driven accessories, a starter-generator is mechanically coupled to the compressor-turbine drive shaft to rotate the compressor-turbine drive shaft. The compressor-turbine drive shaft, or compressor shaft, is drivably coupled to accessories, such as a fuel pump and a lubricant pump drive motor (LPDM).

A conventional gearbox requires energy from the battery source to drive components, which include gears, shafts, and clutches. Typically, a bevel gear is located at the front end of the compressor shaft; the bevel gear meshes with a planetary gear train, which may be housed in an inlet housing. This planetary gear train transmits low-pressure compressor power through two drive shafts: one to the starter gearbox, the other to the accessory gearbox to drive an idler system. A gear located on an output power shaft interconnects with a 90° pinion gear in the output power shaft support housing. The gears drive the high-pressure section of an accessory gear train.

The gear arrangement of the gearbox that causes energy draw typically includes the bevel gear, being the accessory gearbox drive gear, which is splined internally to accept the accessory gearbox shaft. This drive shaft connects the gear carrier to the accessory gearbox through the 900 pinion gear, which in turn is splined directly to a starter-generator drive gear. The starter-generator drive gear provides drive to all subordinate gears located within the accessory gearbox housing.

The energy required to start the engine, or rotate the compressor, must be in excess of that required to overcome rotor inertia and engine friction and air loads. The starter must produce sufficient torque to start the engine properly. Engines must be rotated and accelerated above a certain minimum rotational and acceleration rates if consistently good starts are to be achieved. The torque characteristics of an acceptable starter must be well above the required minimum.

FIG. 1 is a schematic of a start control scheme according to the prior art. A battery 10 provides power to a full authority digital electronic controller (FADEC) 12, which is operably connected to a starter controller and/or pump controller 14. FIG. 1 shows the starter/pump controller 14 as one integrated controller. However, in some prior art systems, the starter controller may be physically separated from the pump controller. The starter/pump controller 14 is operably connected to a starter generator 16 and a lubricant pump drive motor 18.

As can be gathered from the foregoing background, the accessory gearbox with its many components is heavy and large. Further, the gearbox requires energy to drive the gears, components, and accessories.

Therefore, there is a need for a cold start mechanization that reduces weight, occupies less space, requires less energy, and minimizes stored energy source size.

SUMMARY OF THE INVENTION

According to one aspect of the present invention, there is provided a turbine engine control system comprising a starter/pump controller configured to send power to a starter-generator, said starter/pump controller configured to prevent power from being directed to an accessory drive motor if said starter-generator is operating with negative torque; and a bulk oil temperature sensor configured to initiate said starter/pump controller if the bulk oil temperature is less than a pre-determined threshold value.

According to another aspect of the present invention, there is provided a gas turbine engine cold start mechanization, comprising a full authority digital electronic controller, said full authority digital electronic controller operably connected to at least one of a turbomachine supply system oil pressure sensor, or an oil temperature sensor, or a rotor position sensor, whereby based on the sensed oil pressure, oil temperature, rotor position, or rotor speed, said full authority digital electronic controller is selectively able to route power to a starter-generator or an accessory drive motor.

According to yet another aspect a gas turbine engine cold start system of the present invention comprises a bulk oil temperature sensor configured to initiate a starter/pump controller if the bulk oil temperature is less than a pre-determined threshold temperature; and a starter/pump controller configured to govern the power to a starter-generator and configured to govern the power directed to an accessory drive motor if said starter-generator is operating with negative torque.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods for a cold start of a turbine engine without the use of a gearbox. Instead of a gearbox, the present invention uses a controller and a motor to take over certain functions formerly performed by the gearbox. The present invention can be manufactured as a component of newly assembled gas turbine engines, or it can be retrofitted into existing gas turbine engines. The invention may employ controllers and brushless motors to divert power to the starter-generator, until the starter-generator creates positive torque, at which time a controller can route power to the brushless motors to drive a respective accessory.

In the present invention, the electric motor driven hydraulic pump assembly is not mechanically coupled to the gearbox. A digital controller can control the hydraulic pump or drive motor speed as well as actuation of an electromechanical valve to delay the start time at which the pump assembly consumes power. The digital controller of the present invention employs brushless direct current (DC) motors to drive units such as a lubricant pump drive motor, that in prior art systems are drivable by a gearbox.

Therefore stored power, such as from a battery, can be delivered to the gas turbine until the gas generator produces a net positive torque. When the gas generator produces a net positive torque, caused by the starter-generator, the excess electrical power can then be routed to the hydraulic pump drive motor.

Structurally, the present invention differs from the prior art by not having a gearbox to drive accessories. Instead of a gearbox, an accessory can be driven by a brushless direct current motor, which can be controlled by a controller.

Figure 1:
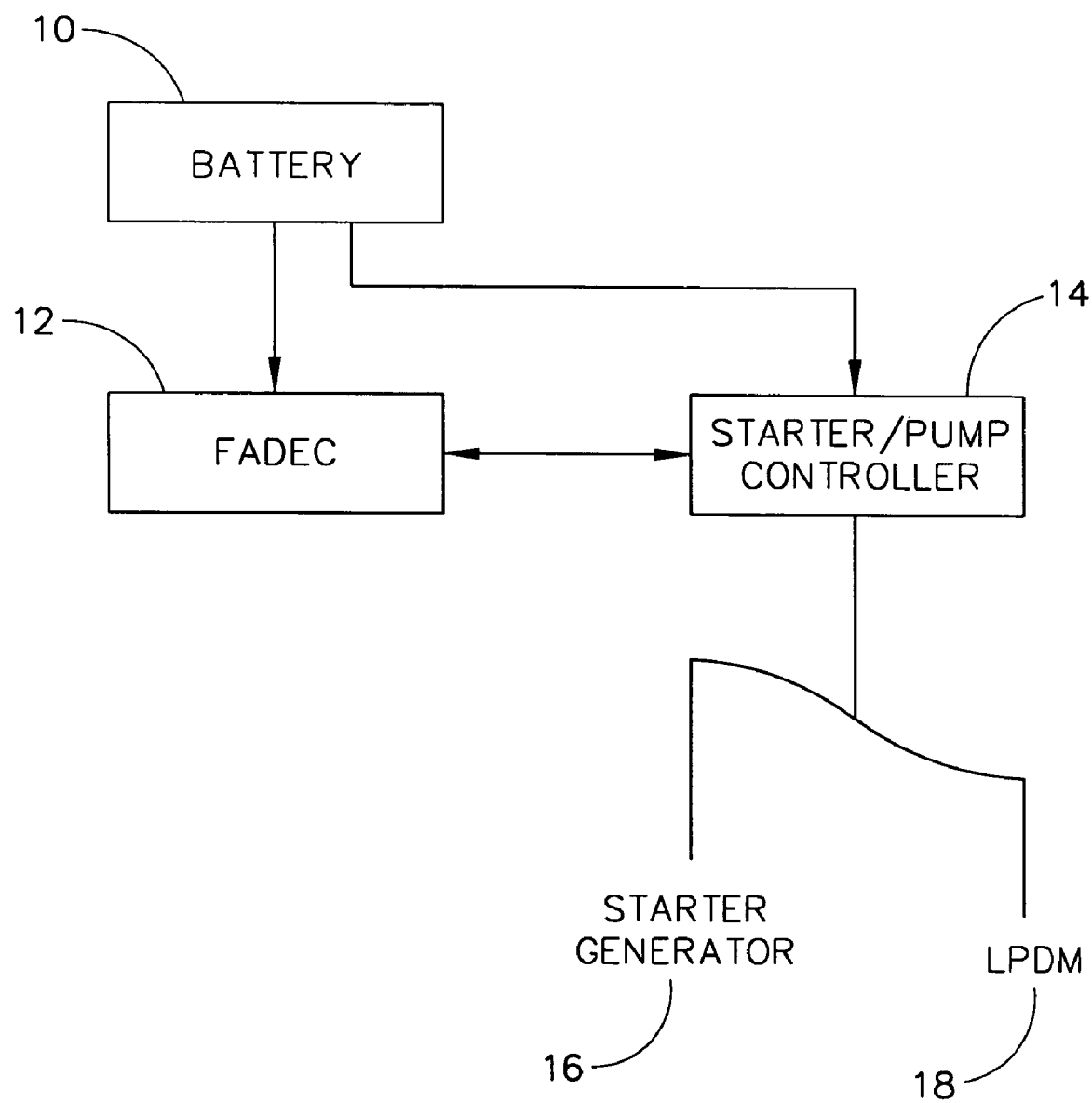
FIG. 1 illustrates a start control scheme of the prior art.
Figure 2:
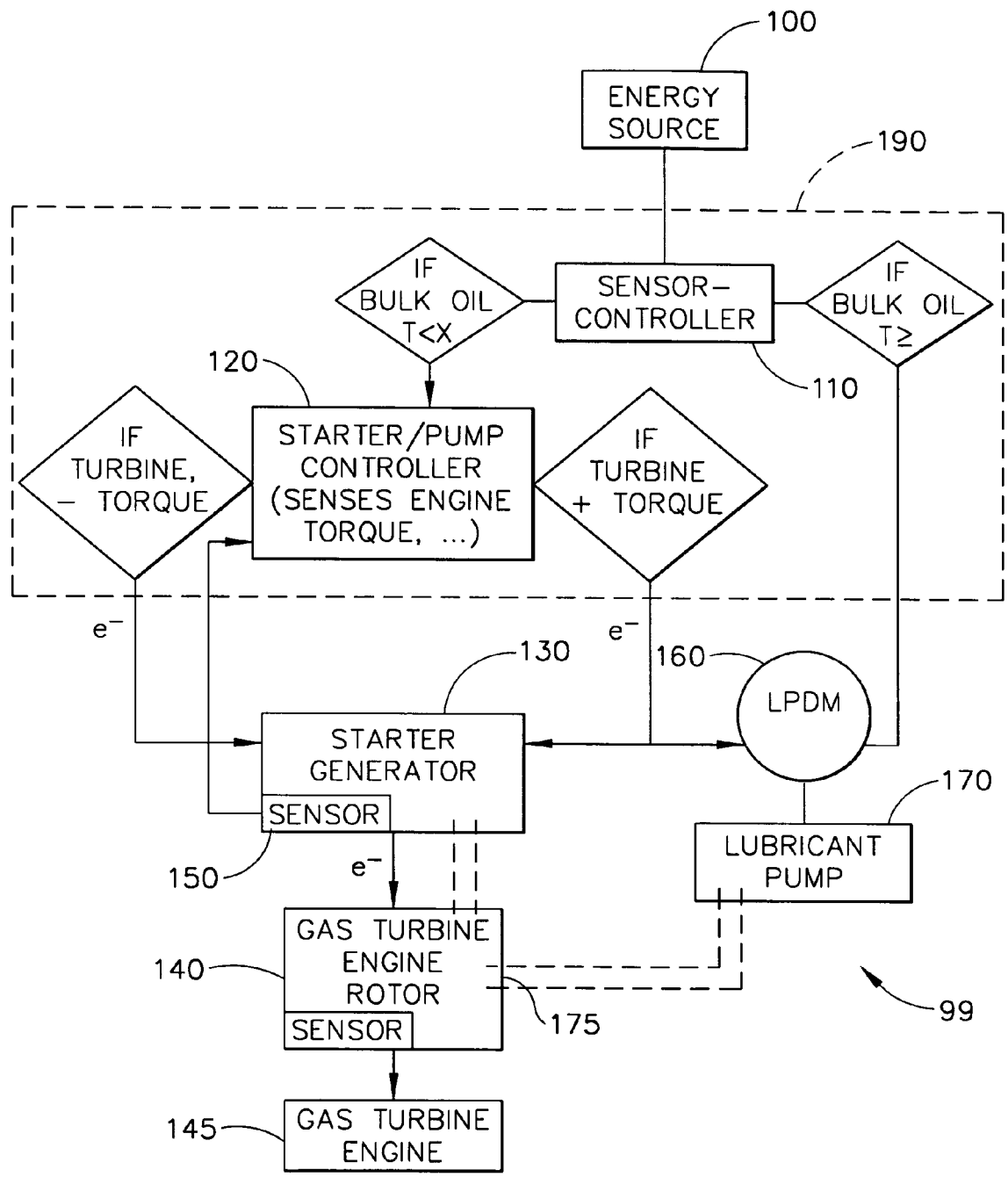
FIG. 2 is a schematic block diagram of a start control system of the present invention.

FIG. 2 is a schematic block diagram of a start control system 99 of the present invention. An energy source 100, such as a battery, can provide power for a controller, such as a sensor-controller 110. The sensor-controller 110 may receive power from the energy source 100. A sensor-controller 110, also referred to herein as a bulk oil temperature sensor or a lubrication supply system pressure sensor, can sense bulk oil temperature or lubrication supply system pressure, among other properties (also see FIG. 7). The bulk oil may be within an engine reservoir (not shown). If the bulk oil temperature is below a certain temperature, such as a pre-determined threshold temperature; or if the lubrication supply system pressure is below a certain pressure, such as a pre-determined threshold pressure, then the sensor-controller 110 may initiate a cold start sequence.

As a non-limiting example, the pre-determined threshold temperature may be about −40° C. (−40° F.). Although FIG. 2 identifies the sensor-controller 110 as the device that senses bulk oil temperature, other sensing devices may work, and need not be physically part of the sensor-controller 110. If the bulk oil temperature is above the threshold temperature; or if the lubrication supply system pressure is above the threshold pressure, then the present invention may not need to be utilized.

If a sensor device, such as the sensor-controller 110, senses that the bulk oil is below the pre-determined threshold temperature; or if the lubrication supply system pressure is above the threshold pressure, the cold start sequence may be initiated by the sensor-controller 110 electronically signaling a starter/pump controller 120 of the present invention. The starter/pump controller 120 may include a FADEC 122. In other words, in an exemplary embodiment of the invention, the starter/pump controller 120 may be interchangeable with a FADEC 122. The starter/pump controller 120 may govern or prioritize the routing of electrical power, and may route power to, and activate, the starter-generator 130. Simultaneously the starter/pump controller 120 may be selectively able to divert power to the starter-generator 130 from an accessory, such as a lubricant pump drive motor (LPDM) 160, which may drive a lubricant pump 170. The starter-generator 130 may be drivably connected to rotate the gas turbine engine rotor 140 to start the gas turbine engine 145. Further, the bulk oil temperature sensor may be configured to route power to an accessory drive motor, such as a LPDM 160 and to the starter-generator 130 regardless of the starter-generator torque. Although a lubricant pump 170 is referenced, the system may drive any suitable pump 170.

Figure 4:
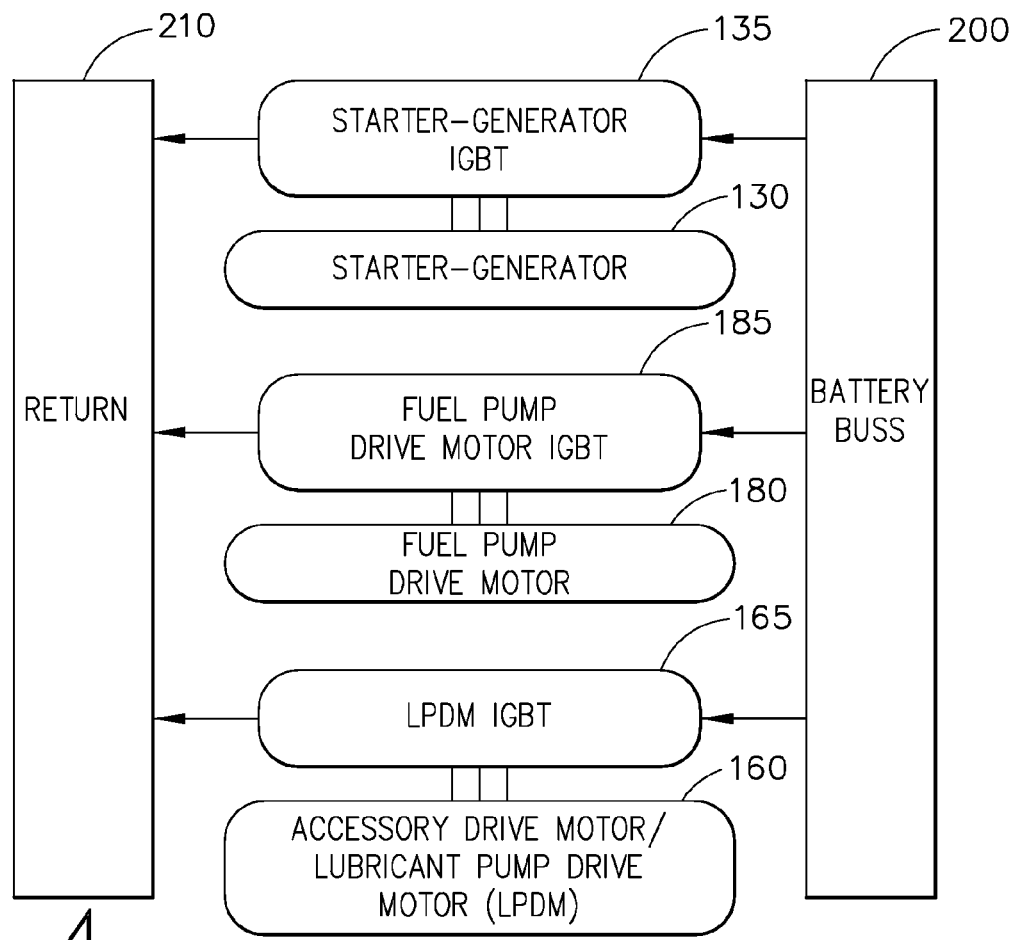
FIG. 4 is a schematic diagram of current flow paths for the accessory motors of a gas turbine engine start control system of the present invention.

In one exemplary embodiment, the lubricant pump drive motor 160 may be a brushless direct current (DC) motor, as schematically diagramed in FIG. 4. Further, an additional accessory of the start control system 99 of the present invention may comprise a fuel pump (not shown), which may be driven by a fuel pump drive motor 180, as seen in FIG. 4. The starter-generator 130 may be electronically connected in parallel with the lubricant pump drive motor (LPDM) 160 or a fuel pump drive motor 180.

Once again referring to FIG. 2, a sensor 150 can determine whether the starter-generator 130 is producing negative net torque. "Negative net torque" is defined as the starter-generator 130 not providing enough power to the gas turbine engine for the gas turbine engine to be self-sustaining. Conversely, "positive net torque" is defined as power that is produced by the gas turbine engine rotor in excess of that required to overcome rotor inertia and engine and friction air loads.

If the starter-generator 130 produces negative net torque, then the starter/pump controller 120 can continue to route power to the starter-generator 130, diverting power from an accessory motor, such as the LPDM 160. In addition to the routing or diverting of power, if the starter-generator 130 produces negative net torque, an electromechanical valve 175 may be actuated to prevent the LPDM 160 from displacing lubricant fluid from the lubricant pump 170 within the gas turbine engine rotor 140.

Once the starter-generator 130 produces positive net torque, power may be generated by the starter-generator 130. Alternatively, once the starter-generator 130 produces a non-negative net torque, power may be generated by the starter-generator 130. This power, referred to as excess power, can then be directed to the accessory motor 160, such as the LPDM 160 or the fuel pump drive motor 180. The term accessory motor 160 and LPDM 160 may be used interchangeably because the system may power any suitable motor 160. Accordingly, when the starter-generator 130 produces positive net torque, the electromechanical valve 175 may be closed to cause lubricant to move to the gas turbine engine to cool and lubricate the engine.

Although FIG. 2 depicts the sensor-controller 110 and the starter/pump controller 120 as being physically separate, they may be integrated into one single integrated controller 190, as shown by the dashed line of FIG. 2.

Figure 3:
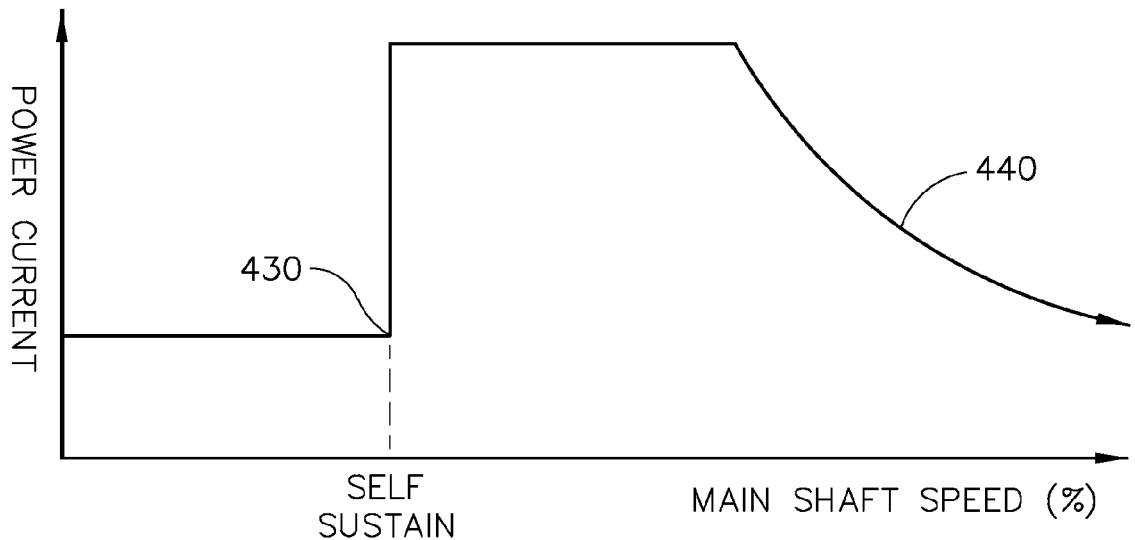
FIG. 3 is a graph illustrating a lubrication pump drive motor power or current profile of the present invention.

FIG. 3 illustrates an exemplary cold start profile for a start control system of the present invention. Specifically, FIG. 3 is a graph that illustrates the relationship of percentage of main shaft, or rotor 140 speed on the x-axis, with respect to power or current usage by an accessory on the y-axis, during a typical cold start event for a gas turbine engine according to an embodiment of the present invention.

Percentage values below the x-axis of FIG. 3 refer to percentage of turbine engine main shaft speed. Starting at the origin and proceeding rightwardly along the x-axis (prior to reaching 430, which is the minimum percentage of main shaft speed to attain self sustaining power). The starter/pump controller 120 or FADEC 122 may direct wattage to be applied to the accessory, and may also initiate rotation of the LPDM 160. Also, the electromechanical fluid control valve 175 can be opened at this point.

As further illustrated in FIG. 3, after reaching the self sustaining point 430, excess power or current produced by the starter generator item 130 may be delivered to the LPDM 160. In one exemplary embodiment, about 500-600 watts may initiate pump shaft rotation at cold start, e.g., at a temperature of about −40° C. (−40° F.). As the mainshaft rotor 140 is rotating at cold start, the delivered wattage may be maintained at about 600 watts to initiate lubricant pump shaft rotation prioritizing power to the starter generator item 130. Then, after the mainshaft has rotated whereby the inertia required to start the electromechanical valve 175 may be decreased, the wattage can be decreased slightly, to close the electromechanical valve 175, if opened, as denoted by line 440.

Again with reference to FIG. 3, when the self sustaining speed 430 is reached, the starter generator 130 may be cut-out, or turned off, by the starter/pump controller 120 or the FADEC 122. At this point, the starter-pump controller 120 may send about 2500-3000 watts to the LPDM 160 for about 30 seconds, as an example. Starting at, for example, 70% of rotor 140 speed, excess power that is generated by the starter-generator 130 may now be available for use by the accessories, or the accessory motors, such as the LPDM 160.

At about 100%+5 seconds of mainshaft speed, for example, the starter/pump controller 120 may reduce the power input to some reduced level as cooling oil flow is now routed through the machine.

FIG. 4 illustrates exemplary current flow paths from a battery buss 200 through at least one insulated gate bipolar transistor (IGBT) 135, 185, 165 for the starter-generator 130, the fuel pump drive motor 185, or the LPDM 160 of the present invention; the flow path continuing from each of the starter-generator IGBT 135, the fuel system drive motor 185, and the LPDM 165 to a return 210. The respective IGBT 135, 185, or 165 can turn the respective starter-generator 130, fuel pump drive motor 180, or LPDM 160 on, if the current or voltage exceeds a certain pre-determined value.

With reference to FIG. 4, in a further exemplary embodiment of the present invention, the electric current delivered to the fuel pump motor 180 may be determined by the required/scheduled fuel pump drive motor 180 speed, the current through the starter-generator 130 may be determined by the torque demanded by the starter-generator 130, and the current through the LPDM 160 may be determined by the pressure demand on the LPDM 160.

Figure 5:
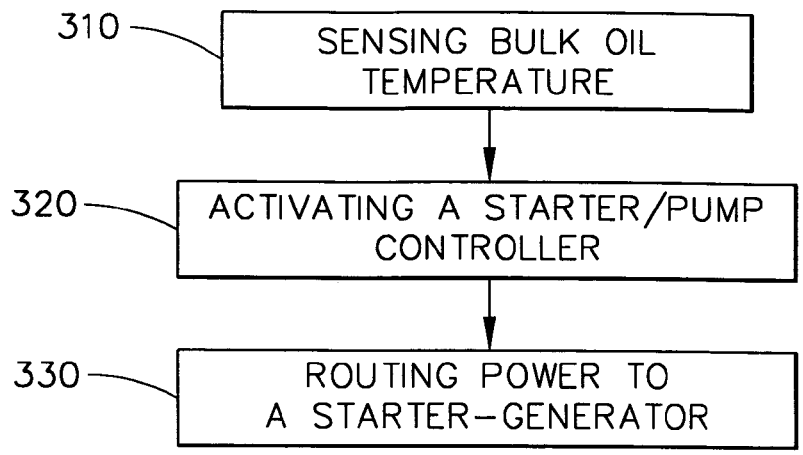
FIG. 5 is a block diagram of a method for controlling a cold start of a gas turbine engine according to another embodiment of the present invention.

FIG. 5 illustrates a method 300 of controlling a cold start event for a gas turbine engine without using a gearbox, according to an embodiment of the present invention. The method 300 may first provide for sensing the bulk oil temperature in step 310. If the bulk oil temperature is below a pre-determined threshold temperature, then method 300 may proceed with a step 320 of activating a starter/pump controller, to cause the routing of power from an energy source to the starter-generator 130 in step 330, until a net positive torque is created in starter-generator 130. While the power is routed to the starter-generator 130, power to an accessory drive motor, such as the LPDM 160 may be limited. When a positive torque is created by the starter-generator 130, then additional power may be routed to an accessory drive motor, such as a LPDM 160.

Figure 6:
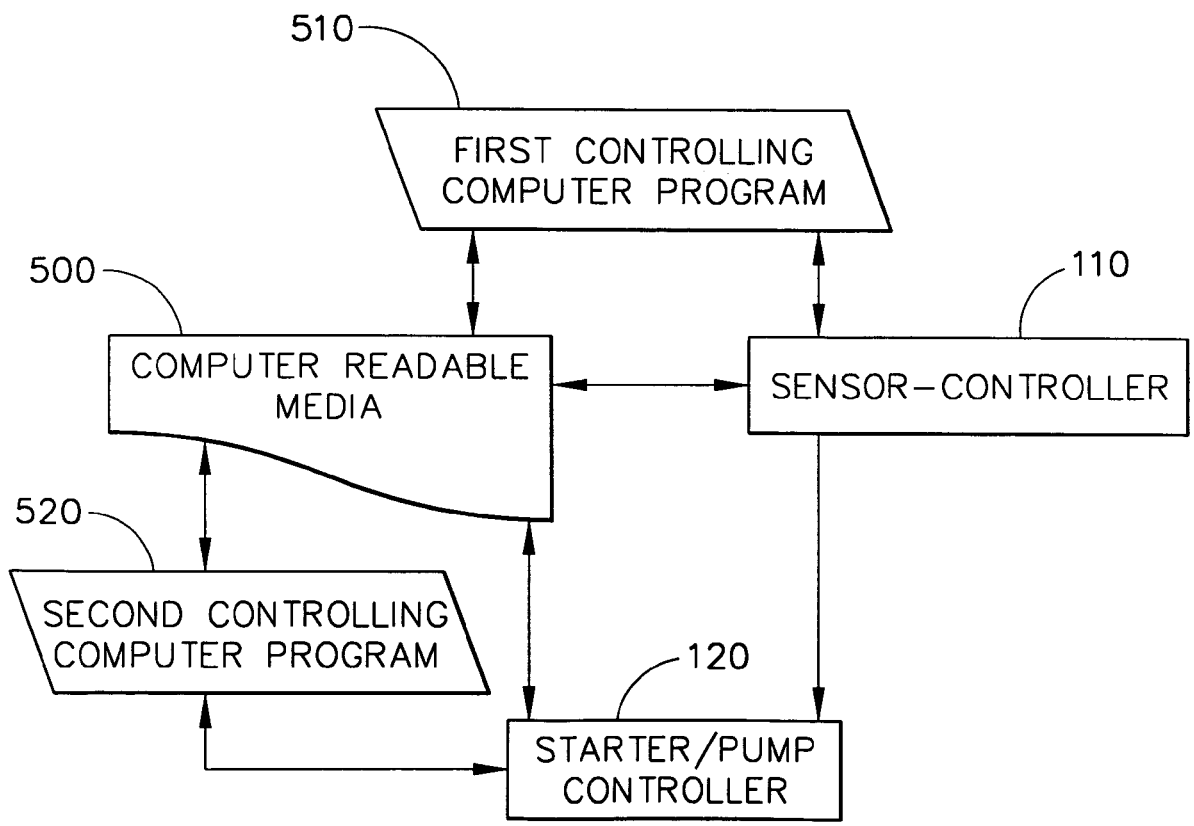
FIG. 6 is a block diagram of an exemplary embodiment of how the present invention may interact with computer readable media.

Further, as illustrated in FIG. 6, computer readable media 500 may be operable with the method and apparatus of the present invention for uses such as memory, control of the sensor-controller 110 and the starter/pump controller 120, displaying the power input and mainshaft speed, calculations, or backup. The computer readable media 500 operably connected to a first controlling computer program 510 to initiate a starter/pump controller 120 if a bulk oil temperature is less than a pre-determined value. The computer readable media 500 may also be operably connected to a second controlling computer program 520 to control the routing of power from an energy source 100 to a starter-generator 130. The second controlling computer program 520 simultaneously limiting power to an accessory drive motor, such as an LPDM 160, while the starter-generator 130 is producing negative net torque.

Further, the computer readable media 500 may be operable for determining, storing, writing, reading, or recording of information generated during the first or second controlling computer program.

Figure 7:
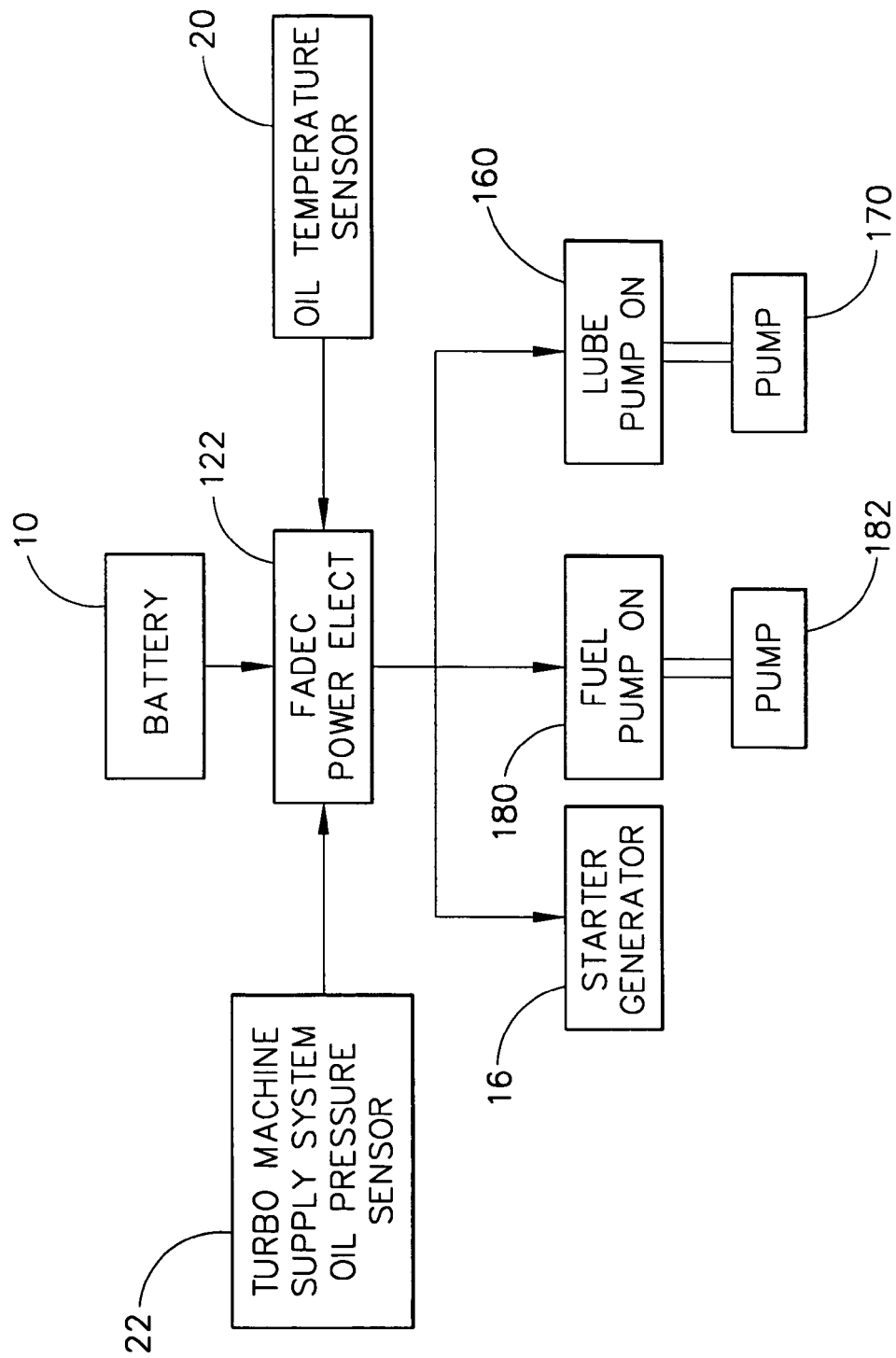
FIG. 7 is a block diagram of a further embodiment of the present invention operably connected to a full authority digital electronic controller (FADEC)

FIG. 7 illustrates another exemplary embodiment. An energy source 100, such as a battery is operably connected to the FADEC 122. The FADEC 122 is operably connected to two sensors, a turbomachine supply system oil pressure sensor 22, and an oil temperature sensor 20, either or both of which may trigger FADEC 122 power management. The FADEC 122 is capable of controlling accessories such as the starter-generator 139, a fuel pump drive motor 180, or a LPDM 160. The fuel pump drive motor 180 is shown being connected to the fuel pump 182. The LPDM 160 is shown being connected to the LPDM pump 170. Here, if the oil temperature is above a threshold (warm) temperature; or if the pressure is above a threshold value, the FADEC 122 will initiate normal warm start mechanization logic. The FADEC 122 will evaluate the oil temperature sensor signal immediately prior to start initiation. If the oil temperature or pressure is below the respective threshold temperature, the cold start mechanization logic of the present invention, as described above, is initiated. The FADEC 122 may look at the turbo machine inlet lubrication system pressure signal and utilize a unique cold start supply system closed loop oil pressure schedule to provide adequate cooling and lubrication flow for oil cooled components (i.e. LPDM 160) within the turbomachine 145 while the turbomachine transitions from cold start conditions to steady state lubrication system command and control.

In one exemplary embodiment of the present invention, if the oil temperature is cold, the FADEC 122 will control and distribute electrical power to the starter-generator 130, the electric motor driven fuel pump 182, and the electric motor driven lubrication pump 170 to minimize the total airframe energy required for a successful turbomachine 145 cold start. The electric power transfer to, for example, the LPDM 160, will be reduced early in the start sequence prioritizing power transfer to, for example, the starter-generator 130 and electric motor driven fuel pump 180. Additional electric power may be transferred to the lubrication pump electric motor when the turbomachine 145 has reached a self-sustaining speed (430 in FIG. 3). Thereby producing net output torque and the starter-generator can transition into a "generate" mode, to produce excess electrical power, which can be routed to, for example, the LPDM 160 to accelerate the pump 170 and circulate cooling oil to turbomachine 145 wetted components.

Figure 8:
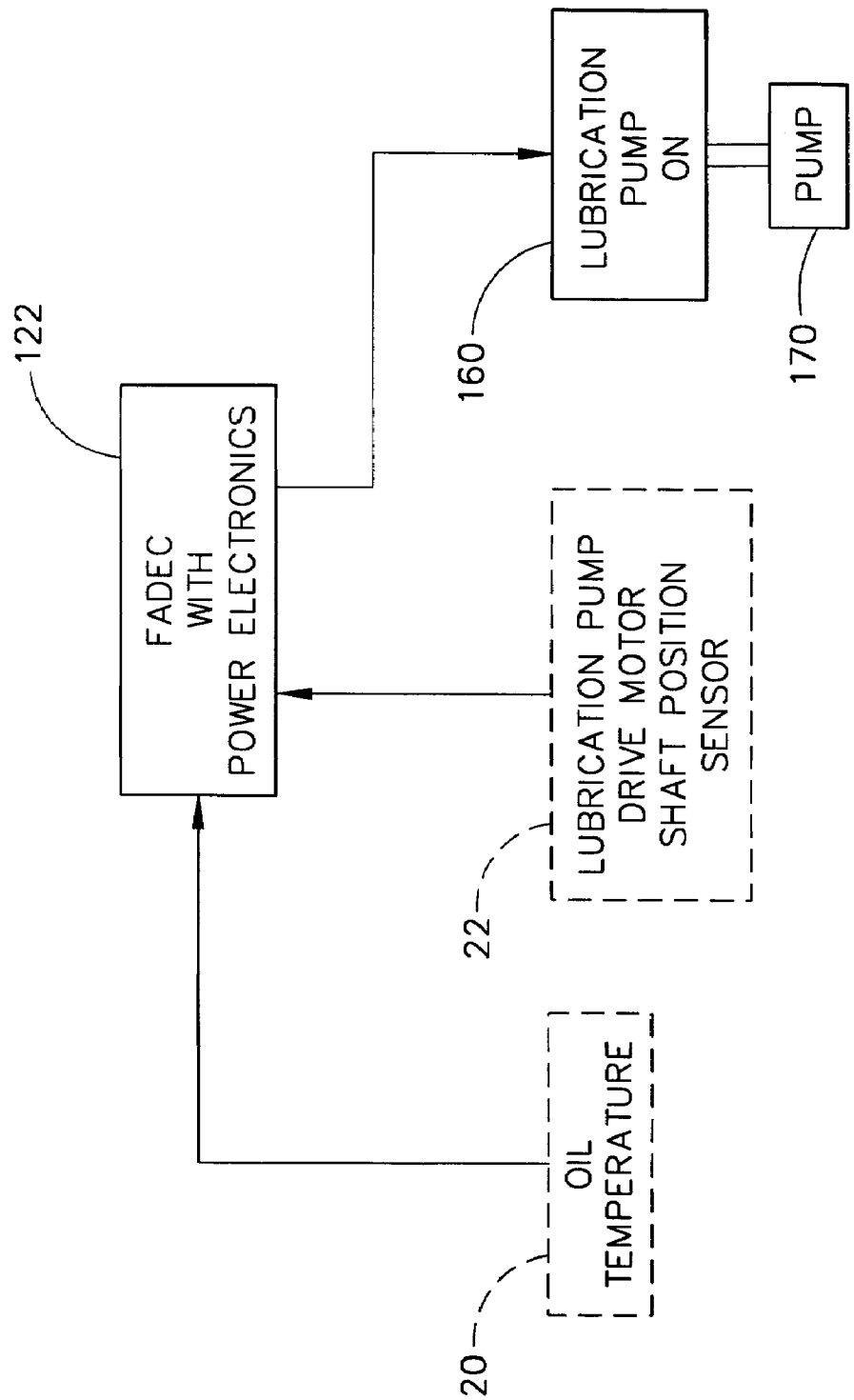
FIG. 8 is a block diagram of a further embodiment of the present invention used with a rotor or shaft position sensor.

As illustrated in FIG. 8, in a further exemplary embodiment, the starter-generator 130 transition to "generate" mode may be sensed via a turbomachine rotor 140 position or speed sensor (not shown).

In further exemplary embodiments of the present invention, rotor or shaft 140 position sensors (not shown) may be utilized to initiate the cold start sequence of the present invention.

It should be understood, of course, that the foregoing relates to exemplary embodiments of the invention and that modifications may be made without departing from the spirit and scope of the invention as set forth in the following claims.

We claim:

1. A turbine engine control system, comprising:
   a starter/pump controller configured to send power to a starter-generator, said starter/pump controller configured to prevent power from being directed to an accessory drive motor if said starter-generator is operating with negative torque; and
   a bulk oil temperature sensor configured to initiate a start sequence for said starter/pump controller if the bulk oil temperature is less than a pre-determined threshold value.

2. A turbine engine control system of claim 1, wherein said starter-generator is operably connected in parallel with said accessory drive motor.

3. A turbine engine control system of claim 1, wherein said accessory drive motor is a brushless direct current motor.

4. A turbine engine control system of claim 1, wherein said bulk oil temperature sensor is configured to route power to an accessory drive motor and to said starter-generator regardless of said staffer-generator torque.

5. A turbine engine control system of claim 1, wherein said accessory drive motor is a lubricant pump drive motor.

6. A turbine engine control system of claim 1, wherein said starter/pump controller is further configured to prevent lubricant from being displaced from a lubricant pump while said staffer-generator is operating with a negative torque.

7. A turbine engine control system of claim 1, wherein said starter/pump controller is further configured to enable lubricant to be displaced while said starter-generator is operating with a net positive torque.

8. A turbine engine control system of claim 1, further comprising a sensor operably connected to route power to the accessory drive motor if said starter-generator is operating with non-negative net torque.

9. A turbine engine control system of claim 1, further comprising a sensor operably connected to route power to the accessory drive motor if said starter-generator is operating with net positive torque.

10. A turbine engine control system of claim 1, further comprising a sensor operably connected to route power to a turbine engine if said starter-generator is operating at a net negative torque.

11. A turbine engine control system of claim 1, further comprising computer readable media operably connected to at least one sensor-controller or said starter/pump controller.

12. A gas turbine engine cold start system, comprising:
    a bulk oil temperature sensor configured to trigger a starter/pump controller to initiate a cold start procedure if the bulk oil temperature is less than a pre-determined threshold temperature; and
    a starter/pump controller configured to govern power to a starter-generator and configured to govern power directed to an accessory drive motor if said starter-generator is operating with negative torque.

13. The gas turbine cold start system of claim 12, wherein said accessory drive motor is a fuel pump motor.

14. The gas turbine cold start system of claim 12, wherein said accessory drive motor is a lubricant power drive motor.

15. The gas turbine cold start system of claim 13, wherein an electric current through the fuel pump motor is determined by the fuel pump motor speed.

16. The gas turbine cold start system of claim 12, wherein an electric current through said starter-generator is determined by the torque demanded by the starter-generator.

17. The gas turbine cold start system of claim 14, wherein an electric current flowing through the lubricant power drive motor is determined by the pressure demand of the lubricant power drive motor.

* * * * *